(12) United States Patent
Safari et al.

(10) Patent No.: US 8,112,660 B2
(45) Date of Patent: Feb. 7, 2012

(54) ROUTER SYNCHRONIZATION

(75) Inventors: Sepehr Safari, San Jose, CA (US);
Ahmad Reza Yazdi, Cupertino, CA (US); Kaushik Pratap Biswas, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 251 days.

(21) Appl. No.: 12/393,477

(22) Filed: Feb. 26, 2009

(65) Prior Publication Data
US 2010/0218033 A1 Aug. 26, 2010

(51) Int. Cl.
*G06F 11/00* (2006.01)
(52) U.S. Cl. ........................................ 714/4.21
(58) Field of Classification Search .................. 714/3, 4, 714/4.1, 4.11, 4.12, 4.2, 4.21; 709/248, 238
See application file for complete search history.

(56) References Cited

U.S. PATENT DOCUMENTS

| 7,280,557 | B1 | 10/2007 | Biswas et al. |
| 7,388,829 | B2 | 6/2008 | Sivakumar et al. |
| 7,443,849 | B2 | 10/2008 | Biswas et al. |

*Primary Examiner* — Scott Baderman
*Assistant Examiner* — Yair Leibovich
(74) *Attorney, Agent, or Firm* — Hickman Palermo Truong & Becker LLP (57) ABSTRACT

Example systems and methods associated with router synchronization are described. One example method includes reducing a likelihood that a first network device will be favored over a peer device as a router. This likelihood may be increased after the first network device has received a threshold amount of routing information from the peer device. This may allow the first network device to begin performing non-routing related tasks after it starts up without causing interruption of data streams for which the first network device does not have current routing information.

25 Claims, 5 Drawing Sheets

ROUTER SYNCHRONIZATION

BACKGROUND

Some conventional networks employ redundant devices to load balance or to reduce the likelihood that devices inside the network may be cut off from devices outside the network. Conventionally, one of the redundant devices may be configured as a primary router and one or more other redundant devices may be configured to be a backup router(s). Thus, the primary router may send routing information such as network address translation (NAT) data to the backup router(s). One conventional system for mirroring NAT data between two redundant devices is known as stateful NAT (SNAT). In the event that the primary router goes down, a backup router may then perform failover services for the primary router by, for example, managing NAT data and taking over routing existing traffic streams between devices inside the network and devices outside the network.

When the primary router becomes active once again, NAT entries may be out of date and/or not properly established in the primary router's NAT database at the time the primary router comes back up. Thus, the primary router may establish a connection with the backup router currently handling network traffic to synchronize NAT data. However, when the primary router becomes active, the primary router may also begin advertising its existence and its routing information to neighboring devices causing traffic to begin to route through the primary device before NAT synchronization has completed. This may break stream based sessions that store sequence information and/or acknowledgment information in NAT data. Some conventional systems attempt to prevent this by configuring the primary router with a static delay before the primary router begins to advertise itself as a path between devices inside the network and devices outside the network. However, when there is a large amount of NAT data to transfer between the backup router and the primary router, the data transfer may not have completed when the static delay has ended. Additionally, during this delay the primary router may not be able to perform other tasks for which the primary router is responsible because neighboring devices may not recognize that the primary router is active.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

BRIEF OVERVIEW

One example method may be performed by a primary router in a network as described above. In the example method, the primary router may begin to advertise its existence to neighboring devices when it comes back online. However, the primary router may advertise itself so that neighboring devices may be less likely to favor the primary router over the backup router as a pathway between devices. In one example, the primary router may advertise its routing table entries with a high link cost (e.g., a link cost higher than a link cost of a backup router). This may make neighboring devices continue to prefer the backup router for network communications. However, a person having ordinary skill in the art can see how other methods of discouraging network devices from using a device as a router may be used.

The example method may also include receiving synchronization data from the backup router. The synchronization data may comprise NAT data. When the primary router has been properly synchronized with the backup router, the primary router may re-advertise its existence in a way that configures neighboring devices to be more likely to favor the primary router as a pathway between devices. In the above example, the primary router may advertise its routing table entries with a low value (e.g., a link cost lower than the link cost of the backup router). This method may allow streams passing between devices inside the network and outside the network to remain uninterrupted while the synchronization is in progress. Additionally, because the primary router remains online and usable during the synchronization process, other duties that the primary router may be configured to perform may begin to function properly when the primary router performs its initial advertisement.

By way of illustration a primary device and a backup device may reside in packet flows between two end devices. In one example, the two devices may border a private network. The primary router may typically be configured to cause packets to flow through itself into and out of the private network. The primary router may do this by advertising routing information to adjacent devices that causes the neighboring devices to favor the primary router over backup routers. Thus, as long as the primary router is running, data streams may favor the primary router. If a situation arises where the primary router is unable to perform normal functions (e.g., becomes disconnected from the network), the backup router may assume routing packets between inside the private network and outside the private network. When the primary router becomes able to perform routing again, it may automatically begin to assume routing responsibilities causing packets to flow through the primary router once again.

One example system facilitates delaying the primary router from reassuming its routing duties. This may allow the primary router to retrieve stateful network address translation (SNAT) data from the backup router that may have changed and/or be new since the primary router became unable to perform routing duties. One example implementation may include delaying advertising routing data so that neighboring devices do not know the primary device has come online. However, other examples may include discouraging traffic from using the primary device by advertising routing data that causes the backup router to remain a favored path between devices inside the private network and devices outside the private network.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 1:
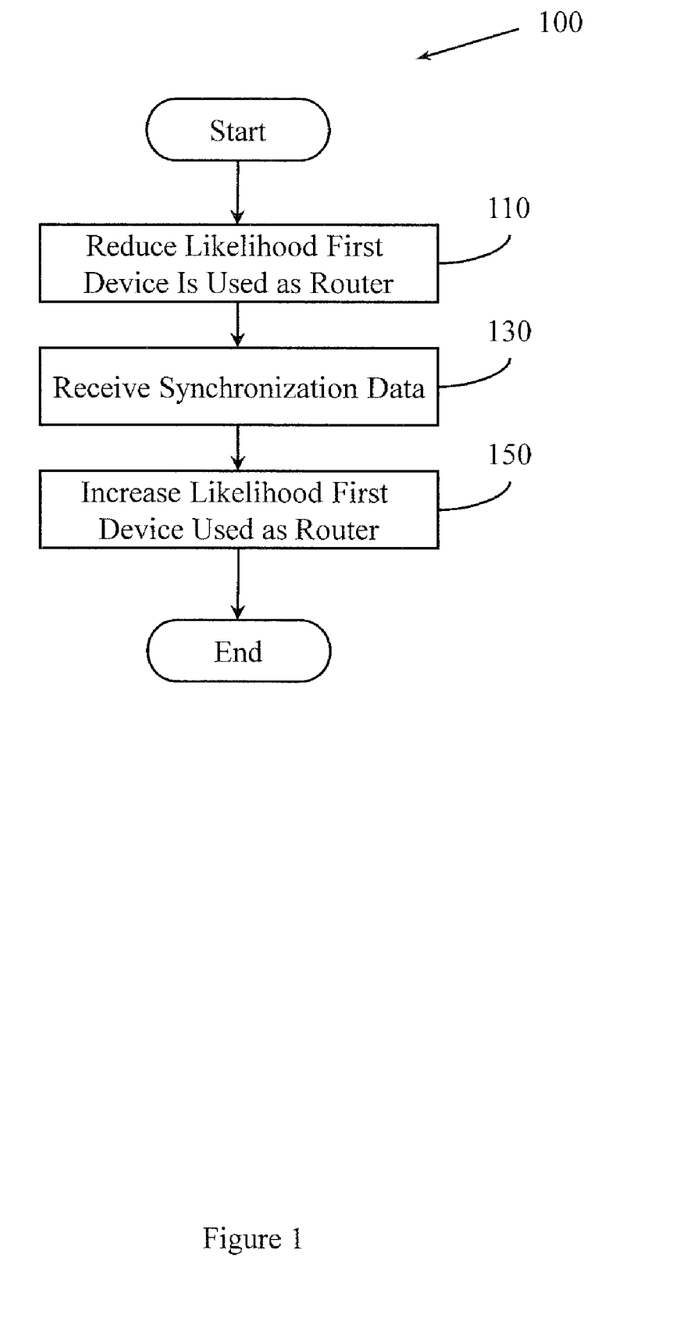
FIG. 1 illustrates an example method associated with network device synchronization.

FIG. 1 illustrates an example method 100. Method 100 includes, at 110, reducing a likelihood that a first network device will be favored over a peer device as a router. The first network device may be part of a communication path between a source device that is providing a set of information and a destination device that is receiving the set of information. By way of illustration, the source device may be a server belonging to a news network that is streaming video and/or audio content to an end user on a personal computer. While a example relating to streaming media is described, a person having ordinary skill in the art can see that there are other methods of transferring data between two devices over a network (e.g., peer to peer, FTP, direct download, online gaming, and so on). The first network device and the peer network device may be members of a group of network devices (e.g., a group of routers). Thus, the first network device may be designated as a primary router among the group of network devices, and the peer router may be designated as a backup router among the group of network devices. Thus, the backup router may perform failover services for the primary router. By way of illustration, if the primary router stops functioning, the peer device may be configured to take over routing traffic that is typically routed through the first network device.

Method 100 also includes, at 130, receiving synchronization data. The synchronization data may be received by the first network device from the peer network device. The synchronization data may comprise network address translation (NAT) data. Method 100 also includes, at 150, increasing a likelihood that the first network device will be favored over the peer device as a router. Increasing the likelihood that the first network device is favored may be performed upon determining that the first network device has received a threshold amount of synchronization data. In one example, the threshold amount may be all of the synchronization data. However, a person having ordinary skill in the art can see how increasing the likelihood may be desirable before all of the synchronization data has been transferred. For example, if synchronization data has been previously prioritized, the likelihood may be increased when higher priority synchronization data has been transferred.

A person having ordinary skill in the art can see that there may be several techniques to increase and/or reduce a likelihood that the first network device will be favored over the peer device. In one example, the first network device may manage a cost (e.g., a link cost) associated with network traffic passing through the device. In this example, the first network device may raise this cost to a maximum value. Raising a link cost of the first network device may allow the first network device to perform other duties it may be configured to perform in addition to allowing the first network device to advertise to neighboring devices that it has become active. However, the high cost may cause other devices to continue to use the peer network device while the peer network device remains active. Other techniques for managing the likelihood that the first network device will be used may include enabling or disabling a routing protocol in the first network device, setting the first network device to a passive state or an active state, enabling or disabling a port that receives routing communications on the first network device, and so on.

Method 100 may be performed by the first network device when the first network device becomes active in the network. Additionally, method 100 may be performed after the first network device becomes active after the peer device has performed failover services for the first network device. These failover services may have been configured by the first network device. However, a person having ordinary skill in the art can see how method 100 may be applicable in other situations (e.g., the first network device coming online for the first time). Configuring failover services may include controlling settings and/or device properties of the peer device. Configuring failover services may also include mirroring NAT data to the peer device while the first network device is handling network communications. This mirroring may allow the peer network device to quickly perform failover services (e.g., take over network communication handling) should the first network device encounter a situation that makes the first network device unable to route network communications properly.

While FIG. 1 illustrates various actions occurring in serial, it is to be appreciated that various actions illustrated in FIG. 1 could occur substantially in parallel. By way of illustration, a first process could reduce the likelihood, a second process could receive synchronization data, and a third process could increase the likelihood. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a tangible media may store computer executable instructions that if executed by a machine (e.g., processor) cause the machine to perform a method. While executable instructions associated with the above method are described as being stored on a tangible media, it is to be appreciated that executable instructions associated with other example methods described herein may also be stored on a tangible media.

A "tangible media", as used herein, refers to a medium that stores signals, instructions and/or data. A tangible media may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a tangible media may include, but are not limited to, a floppy disk, a flexible disk, a hard disk, a magnetic tape, other magnetic medium, an application specific integrated circuit (ASIC), a compact disk CD, other optical medium, a random access memory (RAM), a read only memory (ROM), a memory chip or card, a memory stick, and other media from which a computer, a processor or other electronic device can read.

Figure 2:
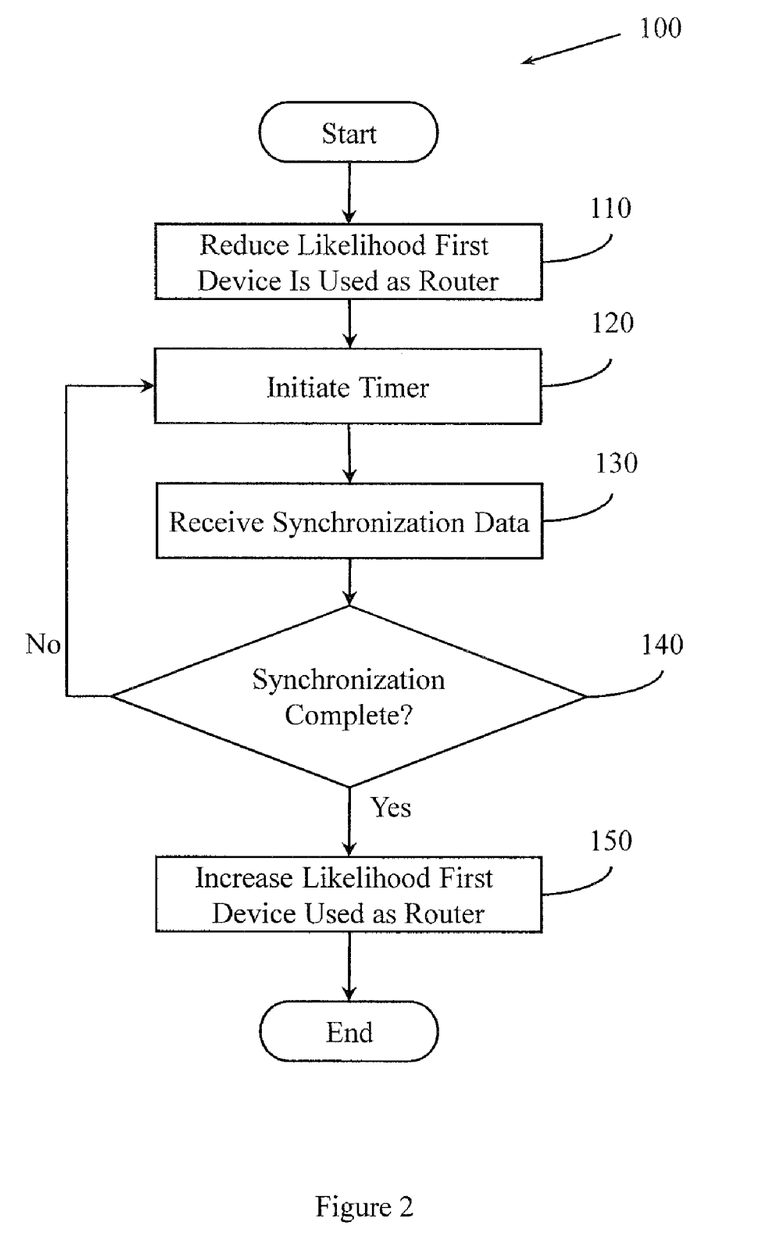
FIG. 2 illustrates another example method associated with network device synchronization.

FIG. 2 illustrates another embodiment of method 100. This embodiment of method 100 includes, at 120, initiating a timer. The timer may be initiated when the first network device begins receiving synchronization data. This timer may be used to determine when to check if the threshold amount of synchronization data received has been met. Thus, method 100 includes, at 140, a check to determine whether the synchronization has completed. If the synchronization has not completed, method 100 may proceed to 120 and restart the timer. However, if the threshold amount of synchronization data received has been met, method 100 may proceed to 150 and increase the likelihood the first network device is used as a path as described above. This check at 140 may facilitate delaying increasing the likelihood by restarting the timer upon determining that the timer has expired and that the first network device is still receiving synchronization data.

Figure 3:
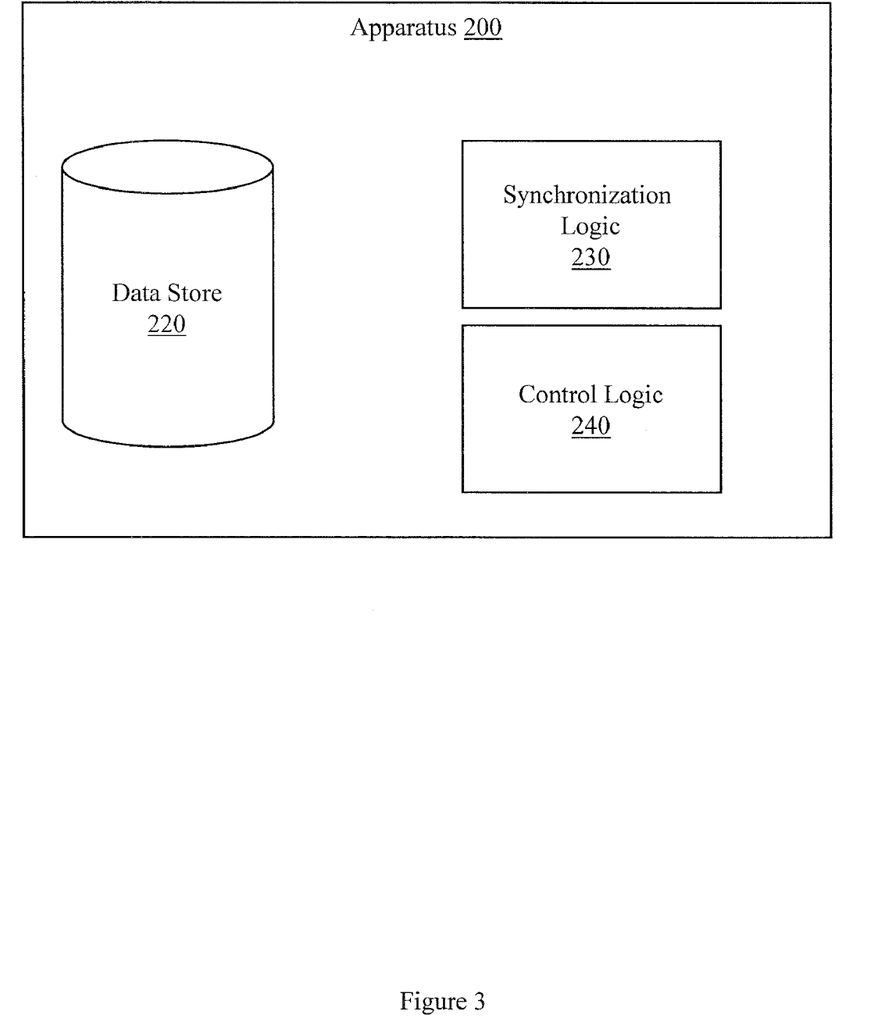
FIG. 3 illustrates an example apparatus associated with network device synchronization.

FIG. 3 illustrates an apparatus 200 associated with router synchronization. Apparatus 200 includes a data store 220. Data store 220 may store network address translation (NAT) data. Apparatus 200 also includes a synchronization logic 230. Synchronization logic 230 may receive synchronization data comprising NAT data from a peer device. Apparatus 200 also includes a control logic 240. Control logic 240 may control a likelihood that the first network device will be favored over the peer device for routing traffic between a source device and a destination device. Control logic 240 may control the likelihood as a function of whether a threshold amount of synchronization data received by synchronization logic has been met. The first network device may be a device designated as a primary router among a group of routers and the peer network device may be designated as a backup router among the group of network devices. The backup router may perform failover services for the primary router.

As described above, a person having ordinary skill in the art can see that there may be several techniques that control logic 240 may use to control the likelihood that the first network device will be favored. Control logic 240 may control a cost associated with the first network device, control a state of the first network device, control a state of a port on the first network device, and so on. Control logic 240 may determine whether the threshold amount of synchronization data had been received upon an expiration of a timer. The timer may be started upon an initiation of synchronization logic 230. If control logic 240 determines that the threshold amount of data has not been received, control logic 240 may restart the timer.

Figure 4:
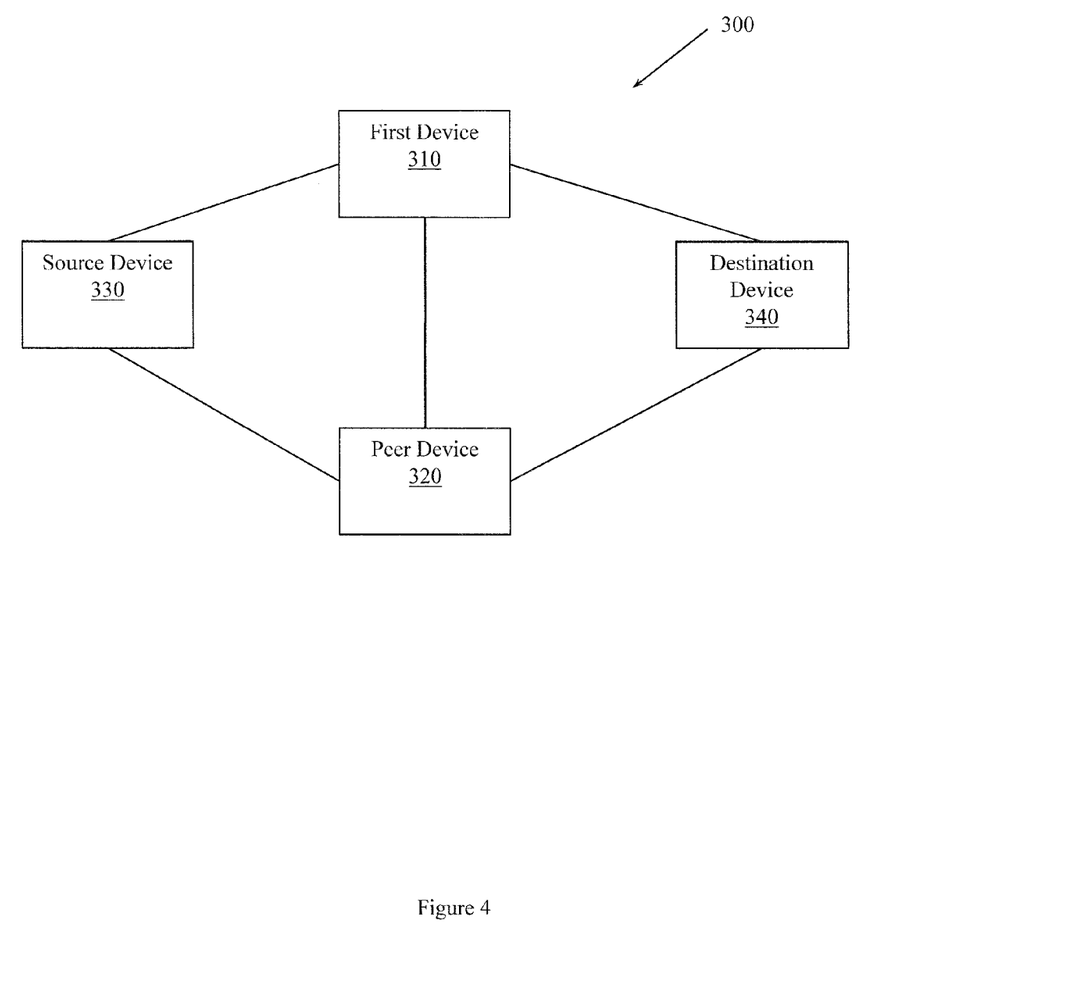
FIG. 4 illustrates an example network in which example systems and methods, and equivalents, may operate.

FIG. 4 illustrates an example network 300 in which example systems and methods, and equivalents, may operate. Network 300 includes a first device 310, and a peer device 320 to which first device 310 is operably connected. Additionally, network 300 includes a source device 330 and a destination device 340. Source device 330 and destination device 340 are both connected to first device 310 and peer device 320. Thus, a first data path may exist that allows source device 330 to provide data to destination device 340. The first data path may go through first device 310. There may also be a second data path between source device 330 and destination device 340 that goes through peer device 320. While source device 330 may be a device from which data being sent to destination device 340 originates, it is to be appreciated that source device 330 and destination device 340 may be intermediary links in a longer data path. Based on information associated with first device 310 and peer device 320, source device 330 may prefer to use the path associated with first device 310 when it is available. This information may include costs (e.g., link costs) associated with first device 310 and peer device 320. A person having ordinary skill in the art appreciates that a link cost is a value that a router may assign to itself to tell other co-networked routers how expensive it is to use the router as a link in a path. Thus, a low link cost may make a router an attractive link and a high link cost may make a router an unattractive link. A person having ordinary skill in the art how other metrics may be controlled by a router to control how attractive the router will be as a link in a path.

The information that causes first device 310 to be favored as a link over peer device 320 may be related to first device 310 being configured as a primary router and peer device 320 being configured as a backup router that performs failover services for the primary router. In this case, first device 310 may be configured to provide NAT data to peer device 320. The NAT data may be related to data streams that use first device 310 as a path between source device 330 and destination device 340. Thus, should first device 310 be brought down or crash, peer device 320 may take over traffic previously routing through first device 310.

In the event that first device 310 is brought down or crashes, peer device 320 may begin to handle traffic previously routed through first device 310. This may begin to happen automatically as network devices recognize that the first data path is no longer available. However, because first device 310 mirrored its NAT data to peer device 320, data streams may be uninterrupted during this transition. When first device 310 comes back online, it may establish a connection with peer device 320 and begin to receive NAT data that has changed since first device 320 went offline. Additionally, first device 310 may begin to advertise its existence to nearby devices in the network with a high link cost. This may allow first device 310 to begin performing non-routing duties for which it is responsible while allowing first device 310 time to receive NAT data from peer device 320. When the data transfer has completed and/or a threshold amount of NAT data has been received, first device 310 may re-advertise its existence to nearby devices, this time with a low link cost. This may cause network devices to begin to favor the first data path again. However, because NAT data may no longer be out of date, data streams may not have to reconfigure first device 310. This may prevent data streams that transition to the first data path from breaking.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

Figure 5:
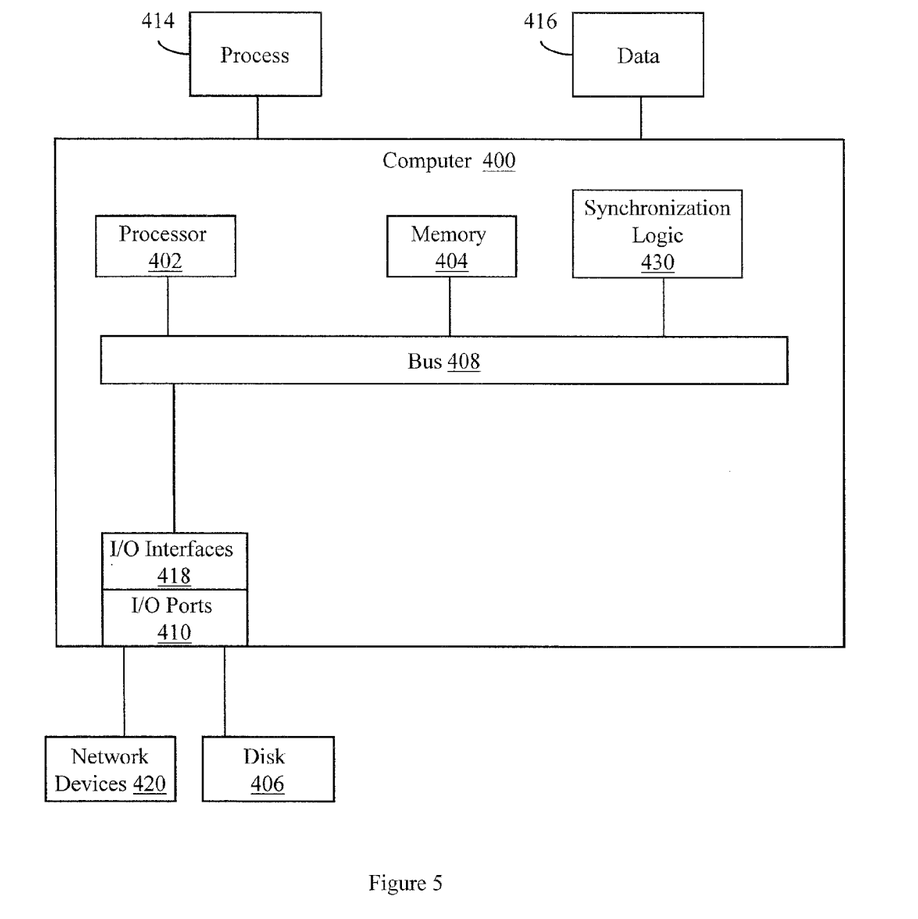
FIG. 5 illustrates an example computing environment in which example systems and methods, and equivalents, may operate.

FIG. 5 illustrates an example computing device in which example systems and methods described herein, and equivalents, may operate. The example computing device may be a computer 400 that includes a processor 402, a memory 404, and input/output ports 410 operably connected by a bus 408. While a computer 400 is described, one skilled in the art will appreciate that a networking device (e.g., router, bridge, gateway) may be employed. In one example, the computer 400 may include a synchronization logic 430 configured to synchronize network address translation data. In different examples, the logic 430 may be implemented in hardware, software, firmware, and/or combinations thereof. While the logic 430 is illustrated as a hardware component attached to the bus 408, it is to be appreciated that in one example, the logic 430 could be implemented in the processor 402.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

Logic 430 may provide means (e.g., hardware, software, firmware) for synchronizing network address translation (NAT) data in a first network device with NAT data from a peer device. Logic 430 may also provide means for discouraging network traffic in the first device while NAT data is synchronizing. The means may be implemented, for example, as an ASIC. The means may also be implemented as computer executable instructions that are presented to computer 400 as data 416 that are temporarily stored in memory 404 and then executed by processor 402. Thus, logic 430 may allow the computer to receive updated synchronization data from the peer device without interrupting data streams that are already traveling through the network.

Generally describing an example configuration of the computer 400, the processor 402 may be a variety of various processors including dual microprocessor and other multi-processor architectures. A memory 404 may include volatile memory and/or non-volatile memory. Non-volatile memory may include, for example, ROM, programmable ROM (PROM), and so on. Volatile memory may include, for example, RAM, static RAM (SRAM), dynamic RAM (DRAM), and so on.

A disk 406 may be operably connected to the computer 400 via, for example, an input/output interface (e.g., card, device) 418 and an input/output port 410. The disk 406 may be, for example, a magnetic disk drive, a solid state disk drive, a floppy disk drive, a tape drive, a Zip drive, a flash memory card, a memory stick, and so on. Furthermore, the disk 406 may be a CD-ROM drive, a CD recordable (CD-R) drive, a CD rewriteable (CD-RW) drive, a digital versatile disk and/or digital video disk read only memory (DVD ROM), and so on. The memory 404 can store a process 414 and/or a data 416, for example. The disk 406 and/or the memory 404 can store an operating system that controls and allocates resources of the computer 400.

The bus 408 may be a single internal bus interconnect architecture and/or other bus or mesh architectures. While a single bus is illustrated, it is to be appreciated that the computer 400 may communicate with various devices, logics, and peripherals using other busses (e.g., peripheral component interconnect express (PCIE), 1384, universal serial bus (USB), Ethernet). The bus 408 can be types including, for example, a memory bus, a memory controller, a peripheral bus, an external bus, a crossbar switch, and/or a local bus.

The computer 400 may interact with input/output devices via the i/o interfaces 418 and the input/output ports 410. Input/output devices may be, for example, a keyboard, a microphone, a pointing and selection device, cameras, video cards, displays, the disk 406, the network devices 420, and so on. The input/output ports 410 may include, for example, serial ports, parallel ports, and USB ports.

The computer 400 can operate in a network environment and thus may be connected to the network devices 420 via the i/o interfaces 418, and/or the i/o ports 410. Through the network devices 420, the computer 400 may interact with a network. Through the network, the computer 400 may be logically connected to remote computers. Networks with which the computer 400 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A logic encoded in one or more tangible media for execution and when executed operable to perform a method, the method comprising:
a first network device reducing a likelihood that the first network device will be favored over a peer device for routing between a source device and a destination device;
receiving, by the first network device, from the peer network device, synchronization data; and
the first network device increasing, upon determining that the first network device has received a threshold amount of synchronization data, the likelihood that the first network device will be favored over the peer device for routing between the source device and the destination device by advertising a routing cost.

2. The logic of claim 1, where the first network device is a device designated as a primary router among a group of network devices and where the peer network device is a device designated as a backup router among the group of network devices.

3. The logic of claim 2, where a backup router is configured to perform failover services for the primary router.

4. The logic of claim 2, where the group of network devices is a group of routers.

5. The logic of claim 1, where synchronization data comprises network address translation (NAT) data.

6. The logic of claim 1, where the method is performed by the first network device when the first network device becomes active.

7. The logic of claim 6, where the method is performed after the peer network device has performed failover services for the first network device.

8. The logic of claim 1, where the first network device increasing the likelihood comprises lowering a cost associated with the first network device and where the first network device reducing the likelihood comprises increasing the cost associated with the first network device.

9. The logic of claim 8, where the cost is a link cost associated with the first network device, and where raising the cost comprises raising the link cost associated with the first network device to a maximum value.

10. The logic of claim 1, where reducing the likelihood comprises disabling a routing protocol in the first network device and where increasing the likelihood comprises enabling a routing protocol in the first network device.

11. The logic of claim 1, where reducing the likelihood comprises setting the first network device to a passive routing state and where increasing the likelihood comprises setting the first network device to an active routing state.

12. The logic of claim 1, where reducing the likelihood comprises disabling a port that receives routing communications on the first network device and where increasing the likelihood comprises enabling a port that receives routing communications on the first network device.

13. The logic of claim 1, the method comprising,
initiating a timer when the first network device begins receiving synchronization data; and
delaying increasing the likelihood by restarting the timer upon determining that the timer has expired and that the first network device is still receiving synchronization data.

14. The logic of claim 1, wherein, before the first network device reduces the likelihood that the first network device will be favored over the peer device for routing between the source device and the destination device, the first network device advertises the first network device as available for routing, wherein advertising the first network device as available for routing creates an initial likelihood that the first network device will be favored over the peer device for routing between the source device and the destination device.

15. The logic of claim 1, wherein the first network device is available for routing before and after the first network device reduces the likelihood that the first network device will be favored over the peer device for routing between the source device and the destination device, and wherein the first network device is available for routing before and after the first network device increases the likelihood that the first network device will be favored over the peer network device for routing between the source device and the destination device.

16. The logic of claim 1, wherein the first network device is available for routing before and after the first network device increases the likelihood that the first network device will be favored over the peer network device for routing between the source device and the destination device.

17. A network device comprising:
a data store to store routing information;
a synchronization logic to receive synchronization data comprising routing information from a peer device; and
a control logic to control, based at least in part on whether a threshold amount of synchronization data received by the synchronization logic has been met, a likelihood that the network device will be favored over the peer device for routing data between a source device and a destination device by advertising a routing cost.

18. The system-network device of claim 17, where the network device is designated as a primary router among a group of network devices and where the peer network device is designated as a backup router among the group of network devices.

19. The network device of claim 18, where a backup router performs failover services for the primary router.

20. The network device of claim 17, where the routing information includes network address translation (NAT) data.

21. The network device of claim 17, where the control logic controls the likelihood that the network device will be favored over the peer device by performing one or more of: controlling a routing cost associated with the network device, controlling a state of the network device, or controlling a state of a port on the network device.

22. The network device of claim 17, where the control logic determines whether the threshold amount of synchronization data has been received upon an expiration of a timer that is started upon an initiation of the synchronization logic, and where the control logic restarts the timer if the control logic determines that the synchronization logic is still operating.

23. The network device of claim 17, wherein the network device is configured to advertise the network device as available for routing before the control logic controls the likelihood that the network device will be favored over the peer device, wherein advertising the network device as available for routing creates an initial likelihood that the network device will be favored over the peer device for routing between the source device and the destination device, and wherein controlling the likelihood that the network device will be favored over the peer device changes the initial likelihood.

24. The network device of claim 17, wherein the network device is available for routing before and after the control logic controls the likelihood that the network device will be favored over the peer device, wherein controlling the likelihood that the network device will be favored over the peer device causes an increase and a reduction in the likelihood that the network device will be favored over the peer device.

25. The network device of claim 17, wherein the network device is available for routing before and after the control logic controls the likelihood that the network device will be favored over the peer device, wherein controlling the likelihood that the network device will be favored over the peer device causes an increase in the likelihood that the network device will be favored over the peer device.

* * * * *